UNITED STATES PATENT OFFICE.

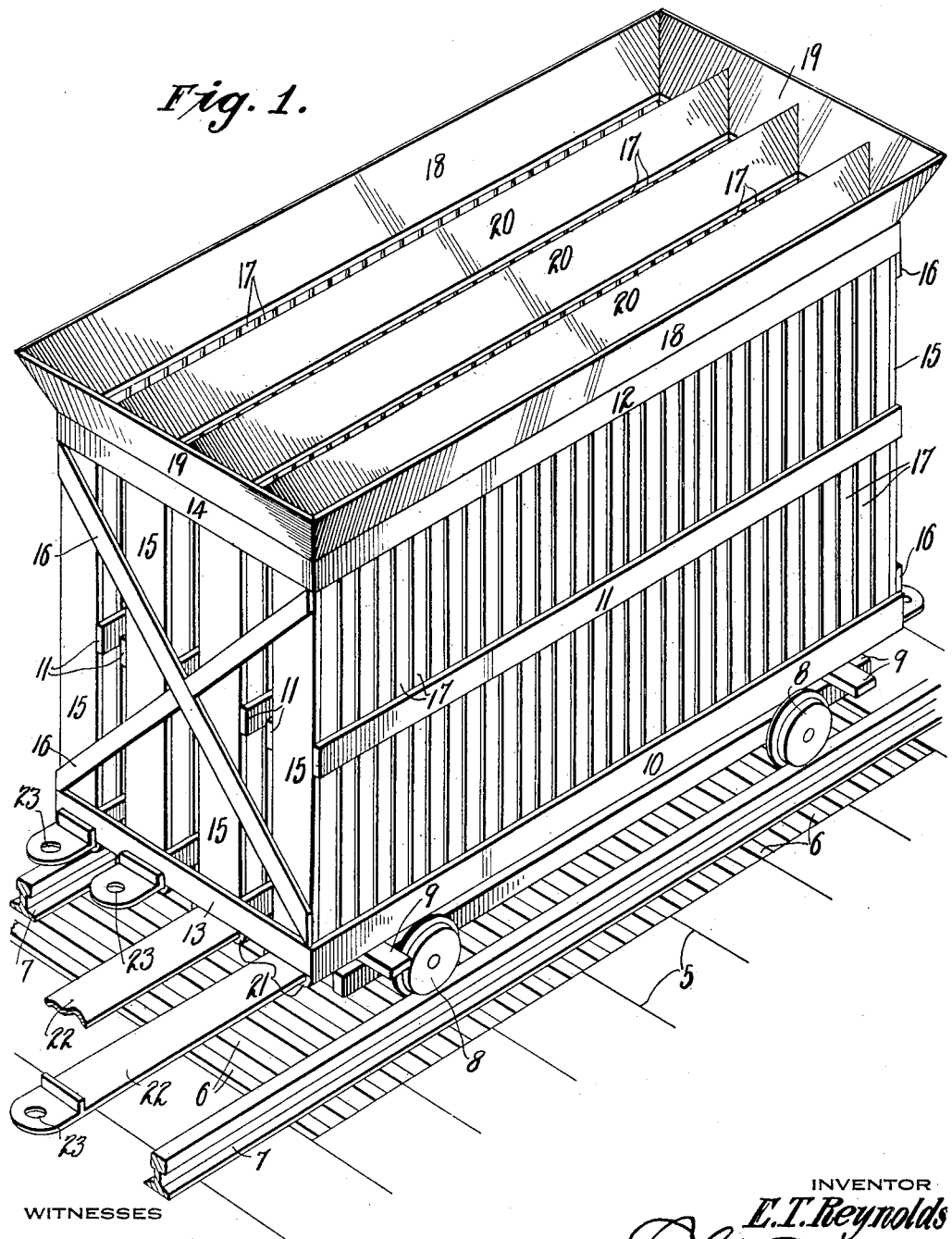

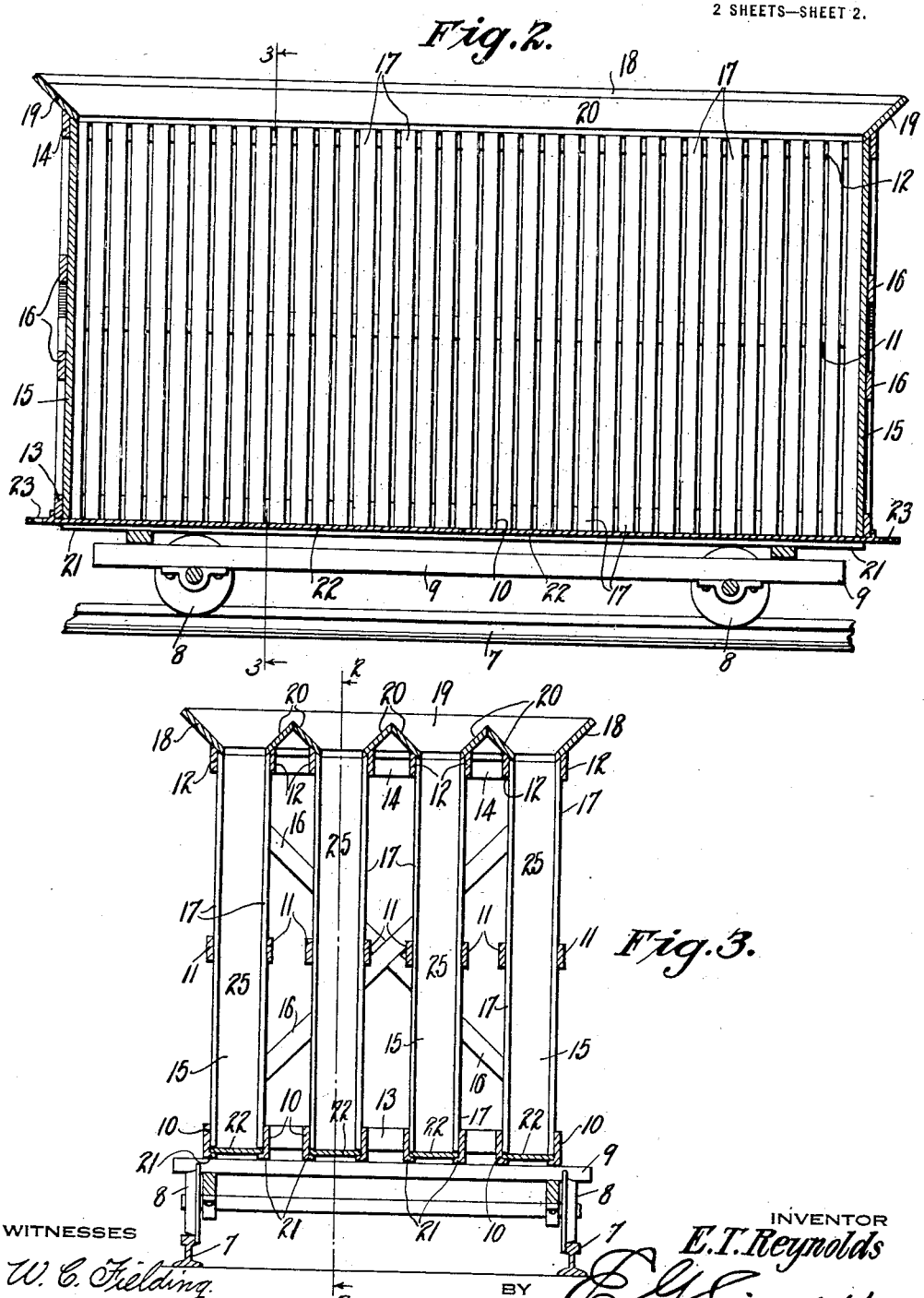

EDWARD TILLOTSON REYNOLDS, OF CHICO, CALIFORNIA.

TRAVELING BLEACHING-FRAME.

1,376,290.  Specification of Letters Patent.  Patented Apr. 26, 1921.

Application filed November 25, 1919. Serial No. 340,622.

*To all whom it may concern:*

Be it known that I, EDWARD TILLOTSON REYNOLDS, a citizen of the United States, residing at Chico, in the county of Butte and State of California, have invented a new and useful Traveling Bleaching-Frame, of which the following is a specification.

This invention relates to bleaching frames of the traveling type, and especially to bleaching frames adapted for bleaching foodstuffs, as dried fruits, nuts, and other articles which are customarily bleached before being shipped to market.

The present method, which is almost universally followed among packers and shippers of dried fruits and nuts, is to fill a plurality of horizontal trays, usually by hand, or perhaps by means of an elevator and spreader, and then to pile the trays, one at a time, on top of each other to form a tier on a car. The car containing the stack of trays is then run along a track into a compartment where the nuts or dried fruits are moistened by steaming. Sometimes the foodstuffs are sprinkled or dipped before spreading on the horizontal top. After they have become thoroughly wet, fumes of sulfur will be run into the compartment. This results in the well understood formation of sulfurous acid with consequent bleaching of the foodstuffs. The car containing the stack of trays is then run out of the sulfuring compartment and is dumped, one tray at a time, by hand labor to a hopper below, usually on the lower floor. From this lower hopper the fruit or nuts are then boxed or sacked and shipped to the market. This method of handling dried foodstuffs is expensive, requires skilled labor, is quite laborious in the double handling of individual trays, and is slow.

The objects of the present invention are to provide a traveling bleaching frame which will make the handling of foodstuffs which are to be bleached, quick, easy and economical, and furthermore, to effect better and more complete bleaching, giving a more uniform product.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention, as expressed in the appended claims.

In the drawings,

Figure 1 is a perspective view of the preferred embodiment of the invention in position for dumping.

Fig. 2 is a vertical longitudinal sectional view of the same, ready to take on a load.

Fig. 3 is a vertical cross sectional view, the line of section being substantially that of line 3—3 of Fig. 2.

The numeral 5 represents a floor, and 6 a grating provided in the floor. 7 represents the rails of a track over which the traveling frame is designed to be run. As shown in Fig. 1, these rails run over the grating 6 so that the bleached material may be dumped from the traveling frame between the bars of the grating into a hopper in a room below. The grating, while permitting nuts or dried fruits to fall through, prevents any workmen from incurring injury.

The traveling bleaching frame proper is made in the form of a hand-car provided with wheels 8 to run upon the rails 7, which wheels are held in proper position upon a frame or bed 9 of any desirable construction. Upon the frame or bed 9 a series of spaced longitudinal members 10 are secured parallel to each other. Transverse members 13 are made fast to the two outer members 10 so that the members 10—13 form a rectangular structure. At each of the corners of this rectangular structure upright members 15 are secured, and at the upper ends of the upright members a second and upper rectangular frame composed of spaced parallel longitudinal members 12 and transverse members 14, is provided. Intermediate the longitudinal members 10 and 12 and secured to the uprights 15 on each side of the car are additional longitudinal members 11. Crossed braces 16 at each end of the structure provide additional rigidity.

The car further comprises a plurality of elongated, upright compartments, each substantially rectangular in form and open at the top, but normally closed at the bottom and on the four sides. These compartments are made up of a series of spaced laths or slats 17, whereby a free circulation of air or other gases is allowed through each compartment. Each compartment is thus seen to be made up of the upright members 15 at either end, and of the slats or laths 17 intermediate those ends, with the longitudinal members 11 bracing the slats and holding them and the upright members 15 together. In the drawings four of these compartments are illustrated, but it is obvious that any number may be employed.

The top of the car or traveling frame has flared sides 18 and ends 19 to form in effect a hopper for the structure. The adjacent walls of each compartment are bridged at their tops by guiding walls 20 meeting in a peak which is of an inverted V-shape in cross section. These inclined walls 20 form closures for the spaces between each of the compartments and furthermore guide the dried fruits, nuts, or the like into the compartments when dumped from above.

Each of the longitudinal members 10 is provided with an inturned flange or guiding lip 21 adapted to receive between them slides 22. There are two of these slides providing a slidable bottom for each of the compartments, the two slides meeting at their inner ends as shown in Fig. 2. The outer ends of the slides are provided with any suitable means, such as a perforation 23, handle or the like, whereby a tool may be connected with them to withdraw them from their seats.

When foodstuffs are to be bleached, the car is run under a hopper containing the same, which hopper may have a slide in its delivering mouth. The slide is withdrawn, and the car is moved forward so that the compartments throughout their entire length are filled with the foodstuff. The hopper-like top of the car prevents any loss of the material during the loading operation, and the sets of inclined walls 20 guide the material into the compartments 21. The car will now be pushed into the sulfuring chamber where the bleaching will take place, as has been outlined above. Then the car is run out of the sulfuring chamber and over the grating, when the slides 22 are withdrawn to dump the contents of the compartments 25 into a hopper provided in the room below. The food may now be packed for shipment.

It will be clear, particularly from Fig. 3 of the drawings, that ample space is provided between each compartment to allow the sulfur fumes to pass in between each compartment and through the slots between the laths, the closures 20 preventing the fumes from passing out through the top. In other words, the space separating the compartments or chambers for the fruit, nuts, etc., is open at the bottom, closed at the top and open at the sides, thus insuring the fumes free entry into the compartments. The compartments are so made that the foodstuff is reached by the bleaching gases on all sides so that a uniform product is obtained.

The operation of handling the foodstuffs does away with nearly all labor, it only being necessary to open the hopper slide to fill the car and to pull out the compartment slides 22 to dump the load. All laborious handling of a series of horizontal trays which must be first set one upon the other and then must be dumped one at a time, is done away with. The present device employs gravity exclusively for its handling of the food product. Furthermore, the upright compartments being elongated and narrow and having wide spaces between them, yield a much more thoroughly and uniformly bleached product than has been found possible with the old style horizontal trays.

It will be understood, of course, that the car or traveling frame may be made of any material that is desired. The construction shown is that of wood, but metal may be employed if preferred, it only being necessary that the metal stand the effects of the sulfur in the bleaching compartment.

What is claimed is:

1. A traveling bleaching frame including a series of spaced upright compartments, each compartment being built up from a plurality of spaced laths or slats to provide for the free circulation of gases therethrough, and said compartments being separated by a space which is open at the bottom and ends and closed at the top, means for directing material falling from above into the compartments, and slides provided at the bottoms of each compartment whereby material contained therein may be dumped out.

2. A traveling frame including a series of spaced apart upright elongated rectangular compartments, each compartment being built up of a series of vertical spaced apart slats or laths providing free passage of gases on all directions through the compartments, and said compartments being separated by a space which is open at the bottom and ends and closed at the top, hopper tops provided for each compartment to direct material into the same, said tops serving as the closure means for the spaces between the compartments, and withdrawable bottoms provided for said compartments whereby material contained therein may be dumped out.

3. A traveling bleaching frame comprising a plurality of spaced upright longitudinally-extending compartments, the sides of each compartment being open for circulation of gases, the tops of each compartment being open, a hopper surrounding the tops of all the compartments and extending beyond the ends and sides of the compartments, and peaked closures bridging the spaces between the compartments at their tops, said hopper and closures combining to guide material dropped from above into the compartments without waste or loss.

4. A traveling bleaching frame comprising a plurality of spaced upright longitudinally extending compartments, each compartment being built up of spaced vertical slats forming the sides thereof, upright end members closing the ends, horizontal longitudinal members bracing and holding the slats and movable bottoms for each compartment whereby the contents thereof may be dumped, crossed braces uniting the ends of the compartments together, and a rectangular bed or under body supporting the whole.

5. A traveling bleaching frame comprising a plurality of spaced upright longitudinally-extending compartments, a bed or under body supporting the compartments and including a series of spaced parallel longitudinal members, each of said longitudinal members having an inturned flange extending part way underneath the adjacent compartment, slides received between two adjacent longitudinal members and supported upon said flanges, said slides forming the bottoms of each compartment, stop means at one end of each slide and engageable with said under body for preventing movement of the slide too great a distance into the compartment.

6. A traveling bleaching frame comprising a plurality of spaced upright longitudinally extending compartments, each compartment being built up of spaced vertical slots forming the sides thereof, upright end members closing the ends, horizontal longitudinal members bracing and holding the slats, and movable bottoms for each compartment whereby the contents thereof may be dumped, braces uniting the ends of the compartments together, a rectangular bed or under body supporting the compartments, said bed or under body including longitudinally extending vertical members parallel to each other and having flanges projecting into the compartments at the bottoms thereof, said bottoms resting upon said flanges and slidable thereon, a hopper surrounding all of the compartments at the top thereof and extending beyond the sides and ends, closures for the spaces between the tops of the compartments and bridging the same whereby material dropped from above will pass into the compartments without waste.

7. In a traveling frame, an under body, a series of compartments mounted upon and extending above said under body, a hopper surrounding all of the compartments and extending beyond the confines of the latter, said hopper forming an integral part of the frame and providing means whereby material dumped into the frame may find its way directly into said compartments.

In testimony, that I claim the foregoing as my own, I have hereto affixed my signature in the presence of two witnesses.

EDWARD TILLOTSON REYNOLDS.

Witnesses:
WM. J. O'CONNOR,
S. H. TROXEL.